(12) United States Patent
Yokota et al.

(10) Patent No.: US 7,755,601 B2
(45) Date of Patent: Jul. 13, 2010

(54) DISPLAY UNIT FOR VEHICLE

(75) Inventors: Hiroyuki Yokota, Shizuoka (JP);
Satoshi Saotome, Shizuoka (JP);
Takeshi Matsumura, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 800 days.

(21) Appl. No.: 11/261,563

(22) Filed: Oct. 31, 2005

(65) Prior Publication Data
US 2006/0092098 A1     May 4, 2006

(30) Foreign Application Priority Data
Nov. 2, 2004   (JP)   ............... 2004-318862

(51) Int. Cl.
*G09G 3/04* (2006.01)
(52) U.S. Cl. ...................... 345/110; 340/461
(58) Field of Classification Search .............. 345/33, 345/110; 340/461
See application file for complete search history.

(56) References Cited

U.S. PATENT DOCUMENTS

| 5,638,523 | A * | 6/1997 | Mullet et al. ............... 715/855 |
| 6,261,650 | B1 * | 7/2001 | Kobayashi et al. ........... 428/1.5 |
| 6,531,958 | B2 | 3/2003 | Kabatek et al. .......... 340/425.5 |
| 2004/0164853 | A1 * | 8/2004 | Wang ......................... 340/442 |
| 2004/0200923 | A1 * | 10/2004 | Lee ............................. 244/1 R |
| 2005/0057351 | A1 * | 3/2005 | Adams et al. ............... 340/461 |

FOREIGN PATENT DOCUMENTS

| DE | 201 05 002 U1 | 8/2001 |
| DE | 101 39 001 A1 | 3/2003 |
| DE | 102 29 875 A1 | 2/2004 |
| JP | 62-58112 | 3/1987 |
| JP | 11-248490 | 9/1999 |

OTHER PUBLICATIONS

German Office Action dated Jan. 9, 2007.

* cited by examiner

*Primary Examiner*—Amr Awad
*Assistant Examiner*—John Morris
(74) *Attorney, Agent, or Firm*—Kratz, Quintos & Hanson, LLP

(57) ABSTRACT

The present invention is to provide a display unit for a vehicle. The display unit has an attractive and three dimensional appearance and is manufactured with low cost. A display unit for a vehicle includes a display screen having display areas displaying a plurality of informations about conditions of the vehicle, a first controller for controlling images displayed on the display screen, and a display partition member disposed on a part of the display areas and having an opening, wherein the first controller controls the display screen to display an image of a display design of a dial on a first display area surrounded by the opening of the display partition member and to rotate the image of the display design based on a prescribed display change specifier signal.

6 Claims, 14 Drawing Sheets

DISPLAY UNIT FOR VEHICLE

BACKGROUND OF THE INVENTION

1. Field of the Invention

The present invention relates a display unit for a vehicle.

2. Description of the Related Art

A conventional display unit for a vehicle is disclosed in JP,62-058112,A(1987).

FIGS. 16A and 16B show an overall view and an example of the display of the conventional display unit, respectively. FIG. 16A shows an instrument panel 120 equipped with the display unit, a steering wheel 121 and a display screen 122 in the instrument panel at a driving seat. The display screen 122 includes a fixed display area 123 displaying a predetermined information and a multiple display area 124 displaying a plural, for example, three kinds of display screens by a selective switch. The three kinds of the displays in the multiple display area 124 are a tachometer indicator, general informations appearing on the instrument panel of a common motor vehicle, and safety monitors.

FIG. 16B shows a display screen 124a of the tachometer indicator. The display screen 124a displays an engine rotation meter 125,or a tachometer and a torque split indicator 126 indicating a power distribution state in front and rear wheels of a four-wheel drive. A charging pressure meter 127, a water thermometer 128, and a fuel gauge 129 are arranged at a lower portion of the display screen 124a.

In the display screen, the torque split indicator 126 showing the power distribution state of the fore and rear wheels of the four-wheel drive becomes an area showing a warning symbol indicator indicating a information about anomaly occurred as shown in FIGS. 17A and 17B.

As shown in FIG. 17A, an enlarged warning symbol 142 such as "a shortage of brake fluid" is displayed on an area 141 of the multiple display area 124 instead of the torque split indicator 126.

After a predetermined time, the area 141 of the multiple display area 14 indicates a reduced warning symbol 142' and the torque split indicator 126.

A conventional display unit for a vehicle is disclosed in JP,H11-248490,A.

FIG. 18 is a vertical side sectional view showing the display unit disclosed in the above document. FIG. 19A is a front view of a display screen showing an example of an analog display. FIG. 19B is a front view showing both the analog display and a car navigation information display. The display unit, shown in FIG. 18, adapted to a combination meter for a vehicle has a facing board 216 and a cover glass 217 disposed in front of a meter case 201.

A liquid crystal 202 is disposed inside the meter case 201 and an controller 203 is disposed behind the liquid crystal 202 and a transparent electroluminescence 204 is disposed in front of the liquid crystal 202.

FIG. 19A is the example of the analog display of the combination meter described above. The liquid crystal 202 shows scale designs 210 consisting of scales 210a and characters 210b. The scale designs 210 form a background for a speedometer 205, tachometer 206, fuel gauge 207, and thermometer 208. An indicator 211 showing a position of a gearshift is displayed in the center of the liquid crystal. FIG. 19B is an example showing the car navigation information 212 and warning 213 displayed on the left half display screen of FIG. 19A.

The electroluminescence (EL) 204 is used as a plane display. The EL 204 is usually transparent and displays desired characters and designs with desired colors on arbitrary portions thereof by controlling the controller 203. The indicators 215 are displayed on the EL 204 and the scale designs 210 forming the background are displayed on the liquid crystal 202. Then, an analog display screen attains a three-dimensional display screen similar to the conventional movable indicators.

The conventional display unit shown in FIGS. 16B and 17A has versatile displays but gives a flat appearance as a whole.

On the contrary, the conventional display unit shown in FIGS. 19A and 19B gives the three-dimensional appearance but increases the cost of manufacturing due to the expensive EL 204 to display the indicators 215.

SUMMARY OF THE INVENTION

The present invention is to provide a display unit for a vehicle. The display unit has an attractive and three dimensional appearance and is manufactured with low cost.

According to a first aspect of the invention, a display unit for a vehicle includes a display screen having display areas displaying a plurality of informations about conditions of the vehicle, a first controller for controlling images displayed on the display screen, and a display partition member disposed on a part of the display areas and having an opening, wherein the first controller controls the display screen to display an image of a display design of a dial on a first display area surrounded by the opening of the display partition member and to rotate the image of the display design based on a prescribed display change specifier signal.

According to a second aspect of the invention, the display unit further includes a plurality of light emitting portions disposed on the display partition member with a prescribed separation and a second controller for controlling the display screen to control at least one of the plurality of the light emitting portions to light in a different type of lighting other than others, wherein the second controller controls the display screen to control the different type of lighting to move from the at least one light emitting portion to the others successively in order to change the display based on the prescribed display change specifier signal.

According to a third aspect of the invention, the display unit further includes a shifter for shifting the display partition member, wherein the first controller controls the display screen to move the image of the display design synchronously with a movement of the display partition member.

According to a fourth aspect of the invention, the shifter supports the display partition member in front of the display screen and includes a frame extending to a rearward of the display screen, a motor fixed on the rear side of the display screen, and a transmission device for moving the frame with a driving power of the motor.

According to a fifth aspect of the invention, the display unit further includes a magnifier lens for magnifying the image of the display design, the lens being attached to the display partition member.

According to a sixth aspect of the invention, the display unit further includes a moving sound generator for generating an effective sound for indicating the movement of the display partition member.

DETAILED DESCRIPTION OF THE PREFERRED EMBODIMENTS

Embodiments of the present invention is explained by referring to drawings.

Figure 1:
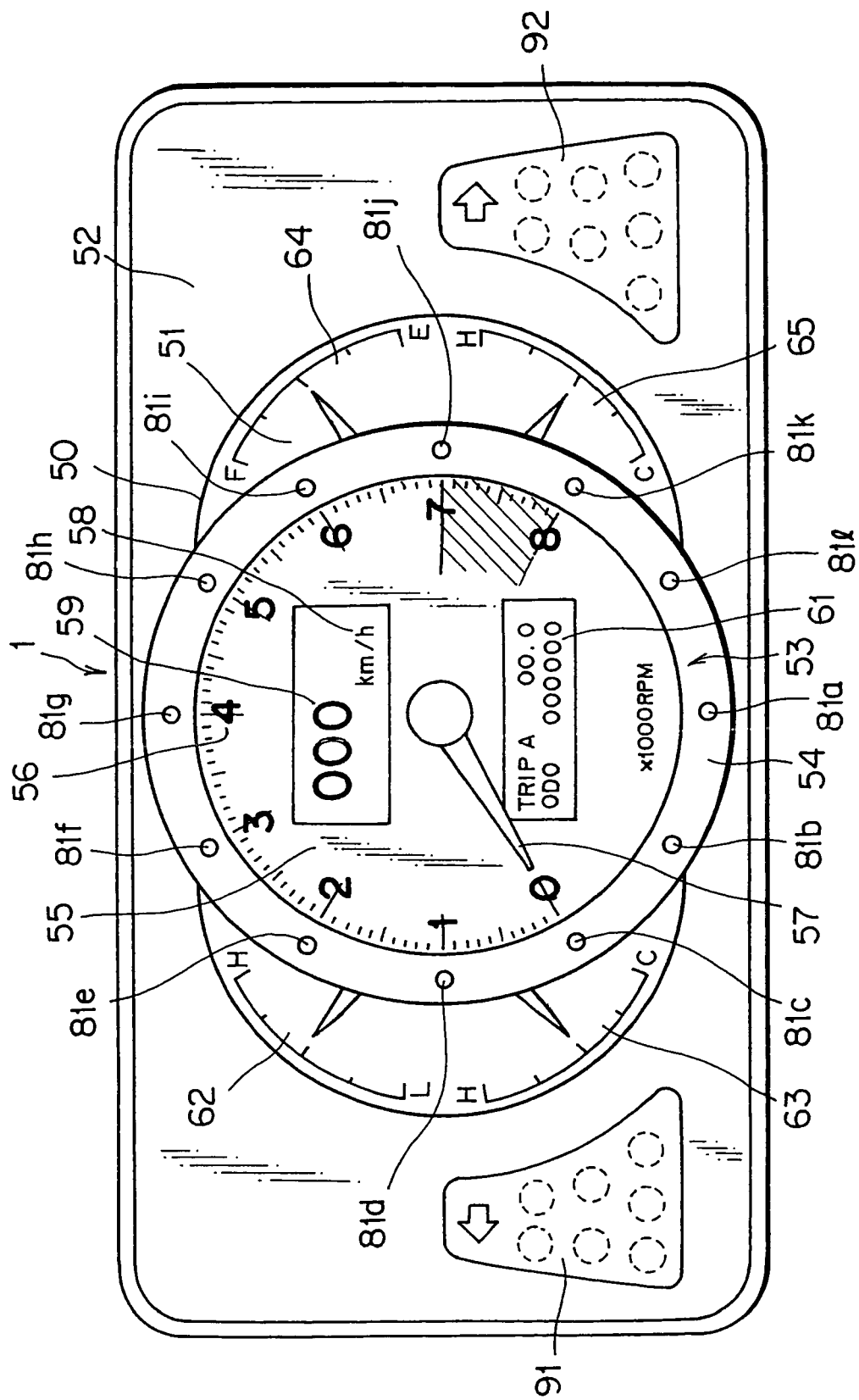
FIG. 1 is a front view of a display unit for a vehicle of an embodiment of the present invention.

FIG. 1 shows a display unit 1 for a vehicle displaying a graphic meter 50 at the center thereof and warning displays 91, 92 at the right and left side of the graphic meter 50.

The graphic meter 50 includes an LCD 51 (liquid crystal display) as a display screen, a facing board 52 covering a part of the display screen of the LCD 51, and a display partition 53 arranged in a front of the LCD 51 and the facing board 52. The LCD 51 has the rectangular display screen and the part thereof is covered with the facing board 52 which has an oval shape opening. The display screen of LCD 51 displays various informations of running state of the vehicle.

The display partition 53 is arranged in the center of the oval shaped display screen. The display partition 53 includes an annular display partition member 54 having a circle opening in the center and made of a transparent synthetic resin, and a magnifier lens 55 fitted in the opening. The magnifier lens 55 can be either concave or convex. The convex lens is utilized in the embodiment. The annular display partition member 54 has a plurality of light emitting portions, for example twelve, 81a to 81l arranged with a predetermined separation, for example, an equal space.

The display area of the LCD 51 surrounded by the annular display partition member 54 shows a display design 56 corresponding to a circular character plate indicating measured values of the running state of the vehicle. The display design 56 is a tachometer indicating a number of revolution of an engine and has a scale at an outer perimeter. A pointer 57 of the display design 56 indicates the number of the revolution of the engine. The display design 56 and pointer 57 are analog displays.

The tachometer scale has numbers of 0 to 10 and line scales between each the number along the circumference. The number scale indicates 1 to be 1000 rpm or 8 to be 8000 rpm of the number of the revolution. A background color between the number 7 and 8 is red and indicates a red zone of rpm of the engine. The red color is different from a background color between other numbers.

The plurality of the light emitting portions 81a to 81l disposed on the annular display partition member 54 coincide with the positions of the numbers 0 to 10 of the display design 56 and are utilized for marks for each number. The light emitting portions of 81c to 81i for the numbers 0 to 6 light in white, the light emitting portions of 81j and 81k light in red, the light emitting portions of 81a, 81b, 81l without the numbers are turned off.

A sub-display area 58 is arranged in the center of the display design 56 to display other informations than the tachometer. The sub-display area 58 includes a speed meter 59 and an odometer/trip meter 61 displayed in a digital display.

An oil pressure meter 62 and oil thermometer 63 of the engine oil are arranged in the LCD display screen 51 defined by the left hand outer circumference of the display partition member 54 and the facing board 52.

A fuel gauge 64 and coolant thermometer gauge 65 are arranged in the LCD display screen 51 defined by the right hand outer circumference of the display partition member 54 and the facing board 52. The fuel gauge 64 and coolant temperature gauge 65 correspond to a second display area. The fuel level and the coolant temperature correspond to a third information of the vehicle.

The display unit 1 can move the display partition 53 to a direction of a long axis of the oval shaped LCD 51.

Figure 2:
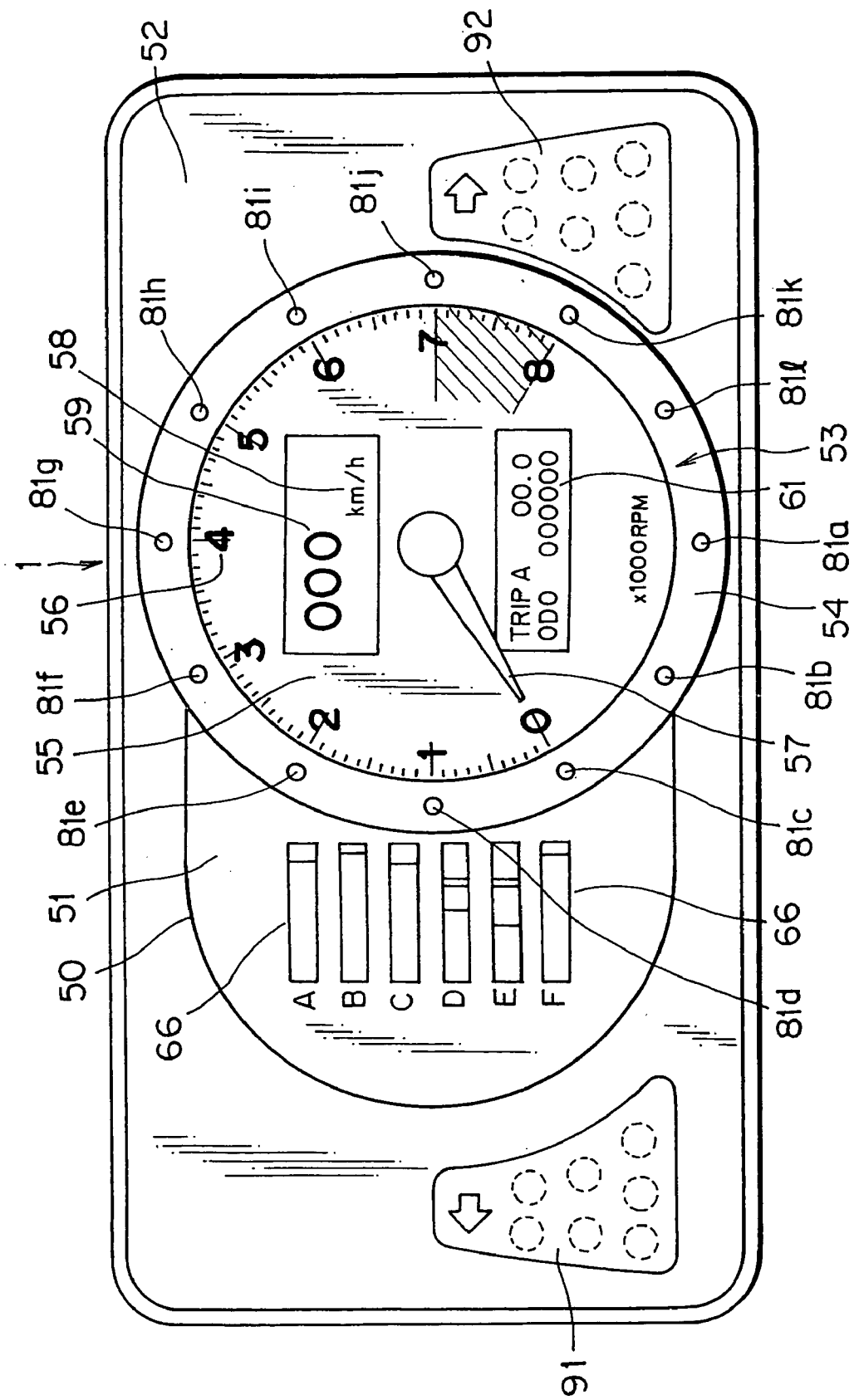
FIG. 2 is a front view showing a state at a shift mode of the display unit of FIG. 1.

FIG. 2 shows a state that the display partition 53 is moved to the right side from the center of the LCD 51. When the display partition 53 is moved, the display design 56 also moves concurrently and displays the same display again after the display partition is stopped.

When the display partition 53 and display design 56 are moved to the left side, the oil pressure meter 62 and oil thermometer 63 displayed in the left side of the LCD 51, and the fuel gauge 64 and coolant temperature gauge 65 displayed in the right side of the LCD 51 disappear. Then, other informations, or a second information of the vehicle, than the prior meters are displayed on the area of from the center to the left side of the LCD 51. In FIG. 2, for example, the informations are engine oil level, brake fluid, coolant, exhausting temperature, intake temperature, and washer fluid.

In the display unit 1, the display design 56 can rotate with a visible speed.

Figure 3:
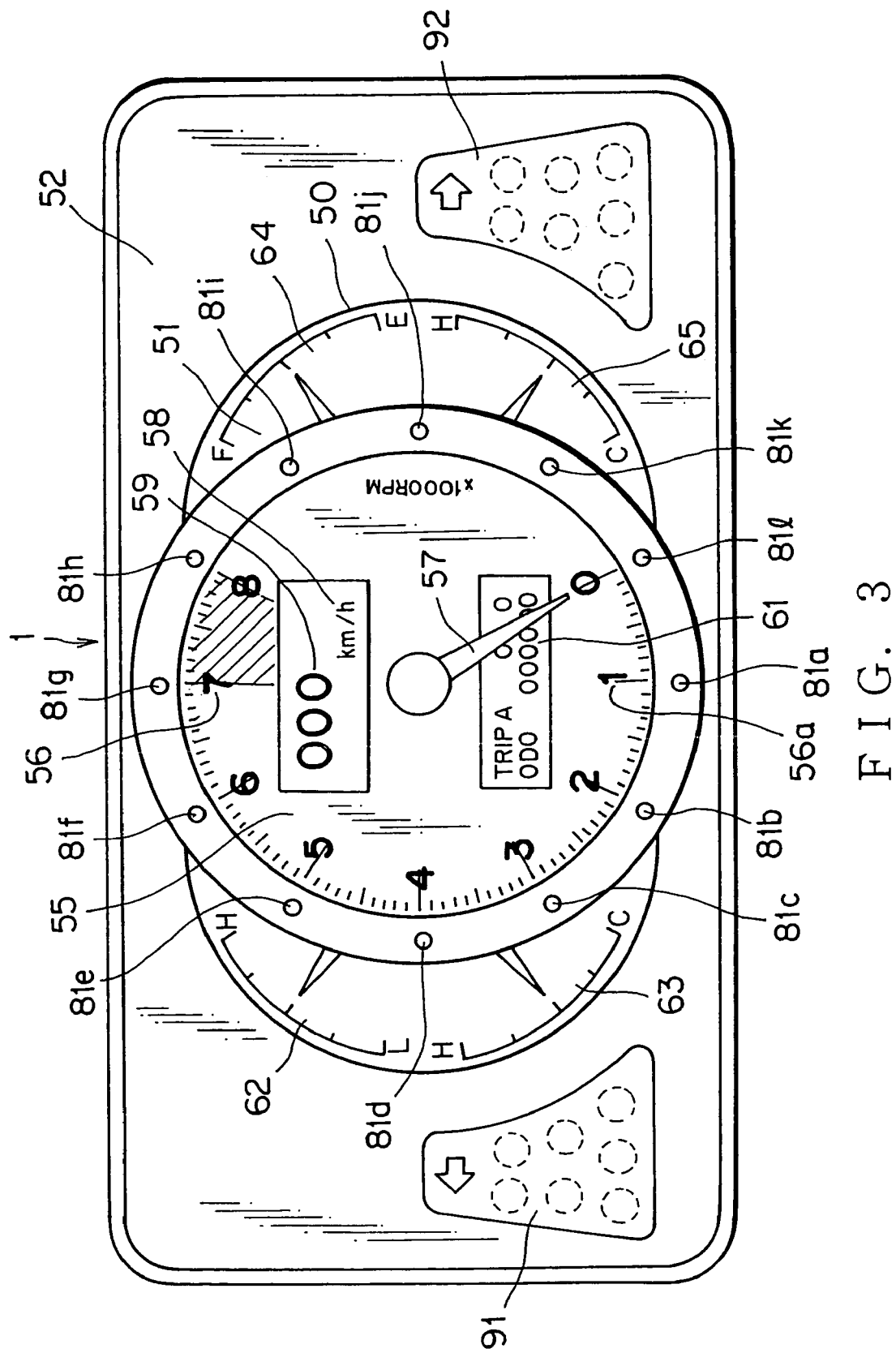
FIG. 3 is a front view showing a state at a rotation mode of the display unit of FIG. 1.

FIG. 3 shows the display design 56 rotated in a counter-clockwise direction from the state of FIG. 1. In FIG. 1, the number scale 0 is located on a lower left. On the contrary, in FIG. 3, the number scale 0 is rotated in the counterclockwise direction with 90 degrees. The sub-display area 58 of the display design 56 does not rotate and is controlled to keep the same position as that of FIG. 1. The red zone between the scale 7 and 8 also rotates and the scale number 7 is positioned uppermost.

The annular display partition member 54 does not rotate when the display design 56 rotates. The lighting of the light emitting portions 81a to 81l is rotated concurrently with the rotation of the display design 56. The light emitting portions 81g and 81h changes the lighting from white to red. The light emitting portions 81*a* to 81*f* and 81*l* light in white and the light emitting portions 81*i* to 81*k* turn off.

Figure 4:
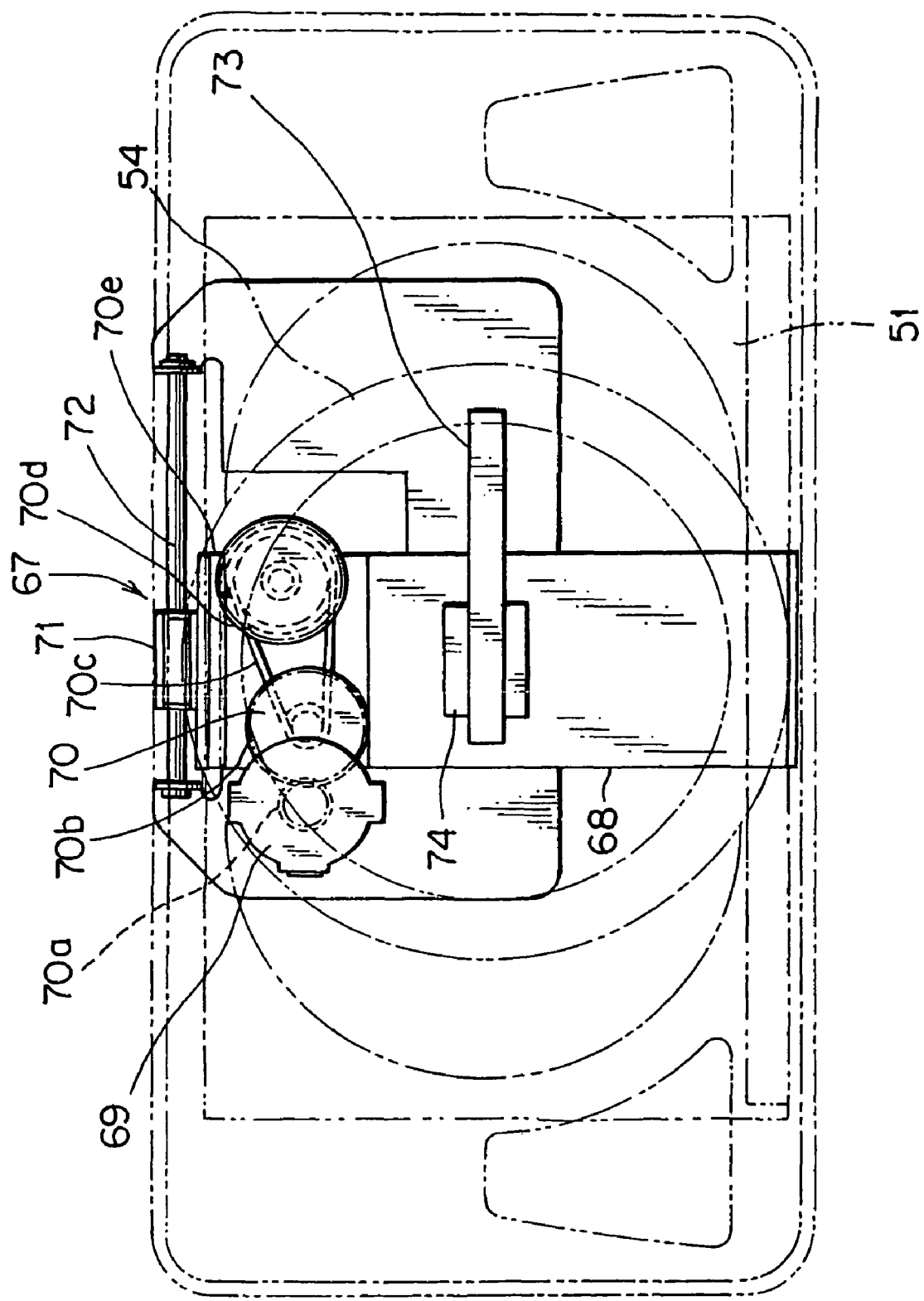
FIG. 4 is a front perspective view illustrating a shifter.
Figure 5:
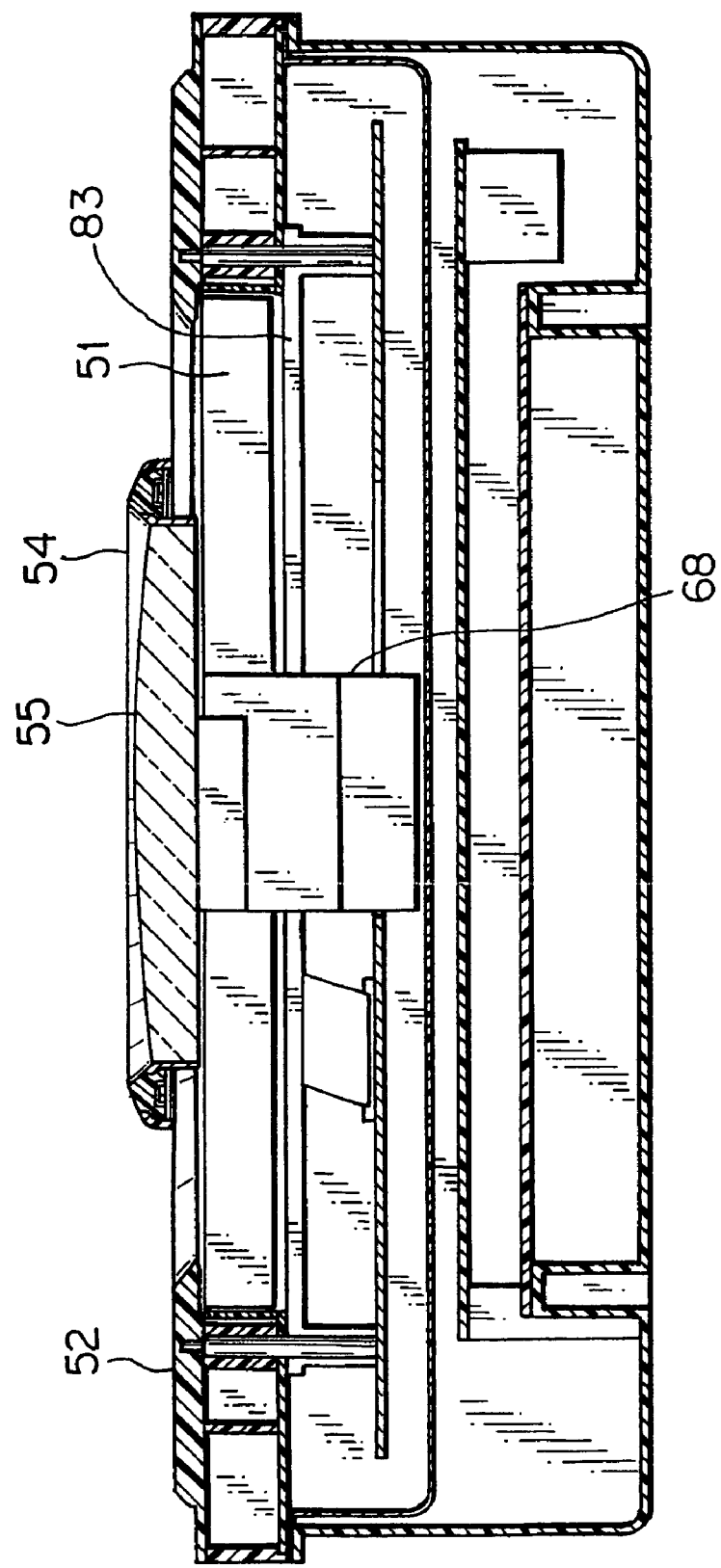
FIG. 5 is a bottom perspective view illustrating the shifter.
Figure 6:
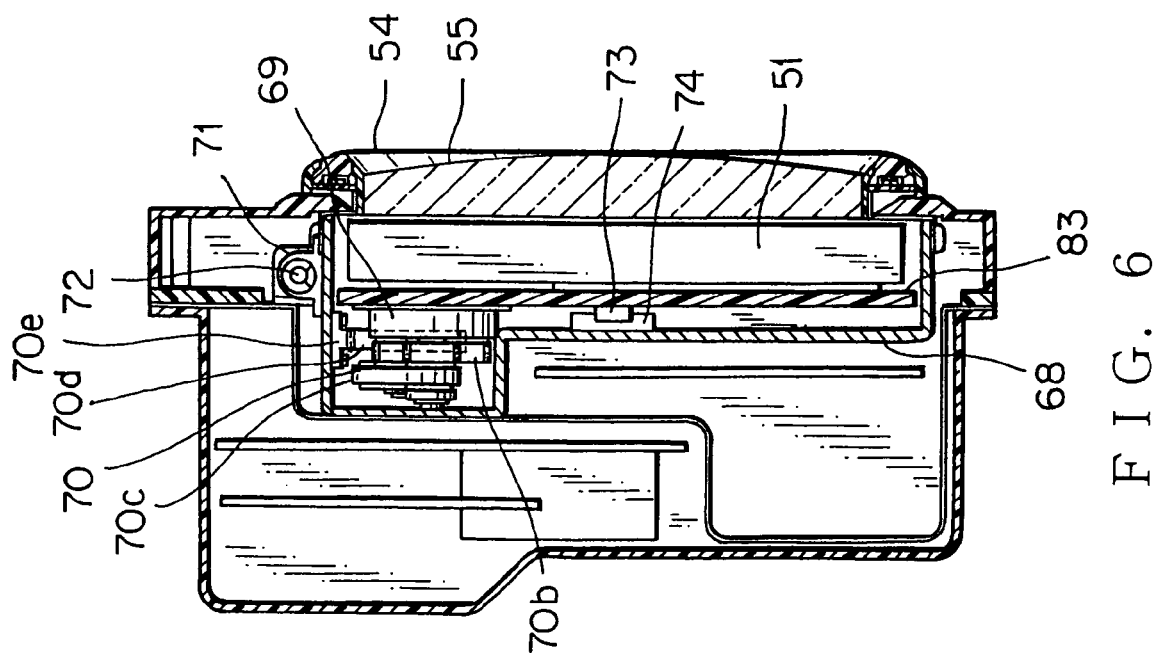
FIG. 6 is a left side perspective view illustrating the shifter.

A shifting mechanism of the display partition 53 is explained. FIGS. 4 to 6 are a front, bottom and left side perspective views of the display unit 1 to explain the shifting mechanism, respectively. The shifter 67 includes a frame 68 extending to a rearside of the LCD 51, a driving motor 69 fixed on a rearside of a base plate 83 holding the LCD 51, and a transmission device 70 for moving the frame 68 with the motor 69. The shifter 67 also includes a first supporter 71 for supporting a part of the frame 68 at an upper portion of the LCD 51, a shaft 72 disposed, in a direction parallel to the long axis of the oval shaped display screen, in a housing of the display unit 1 to be fitted slidably with the first supporter 71, a rail 73 disposed rearward of the base plate 83 in the direction parallel to the long axis of the display screen, and a second supporter 74 attached to the frame 68 and having a guide groove to guide the rail 73.

The transmission device 70 includes a gear 70*a* fixed to a rotation axle of the motor 69, a gear 70*b* interlocking with the gear 70*a*, a pinion gear 70*d* rotated with the gear 70*b* through a belt 70*c*, and a rack 70*e* fixed to the frame 68 and transforming the rotation of the pinion gear to a linear motion parallel to the long axis of the display screen.

Figure 7:
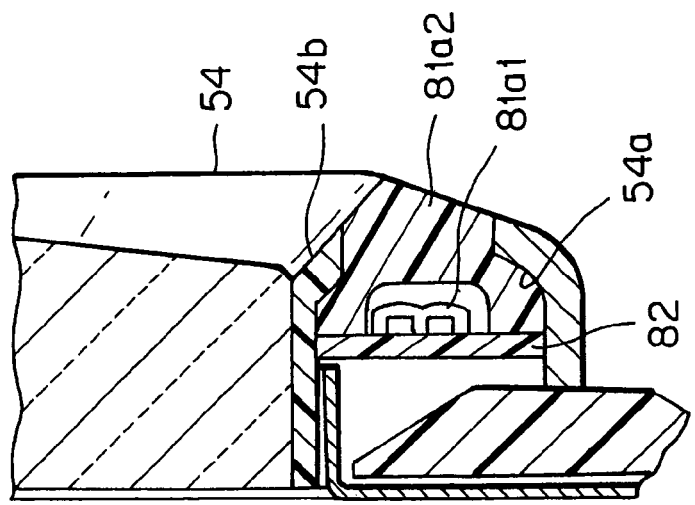
FIG. 7 is a partially expanded view of FIG. 6.

FIG. 7 is a partially expanded view of the annular display partition member 54 of FIG. 6 and explains a structure of the light emitting portion 81*a*. The light emitting portion 81*a* includes two colors LED (light emitting diode) 81*a*1 disposed in a recess 54*a* inside the annular display partition member 54 and mounted to a annular circuit board 82, and a transparent member 81*a*2 attached to a window 54*b* formed in the annular display partition member 54. The other light emitting portions 81*b* to 81*l*, not shown, have the same structure as the light emitting portion 81*a*.

Figure 8:
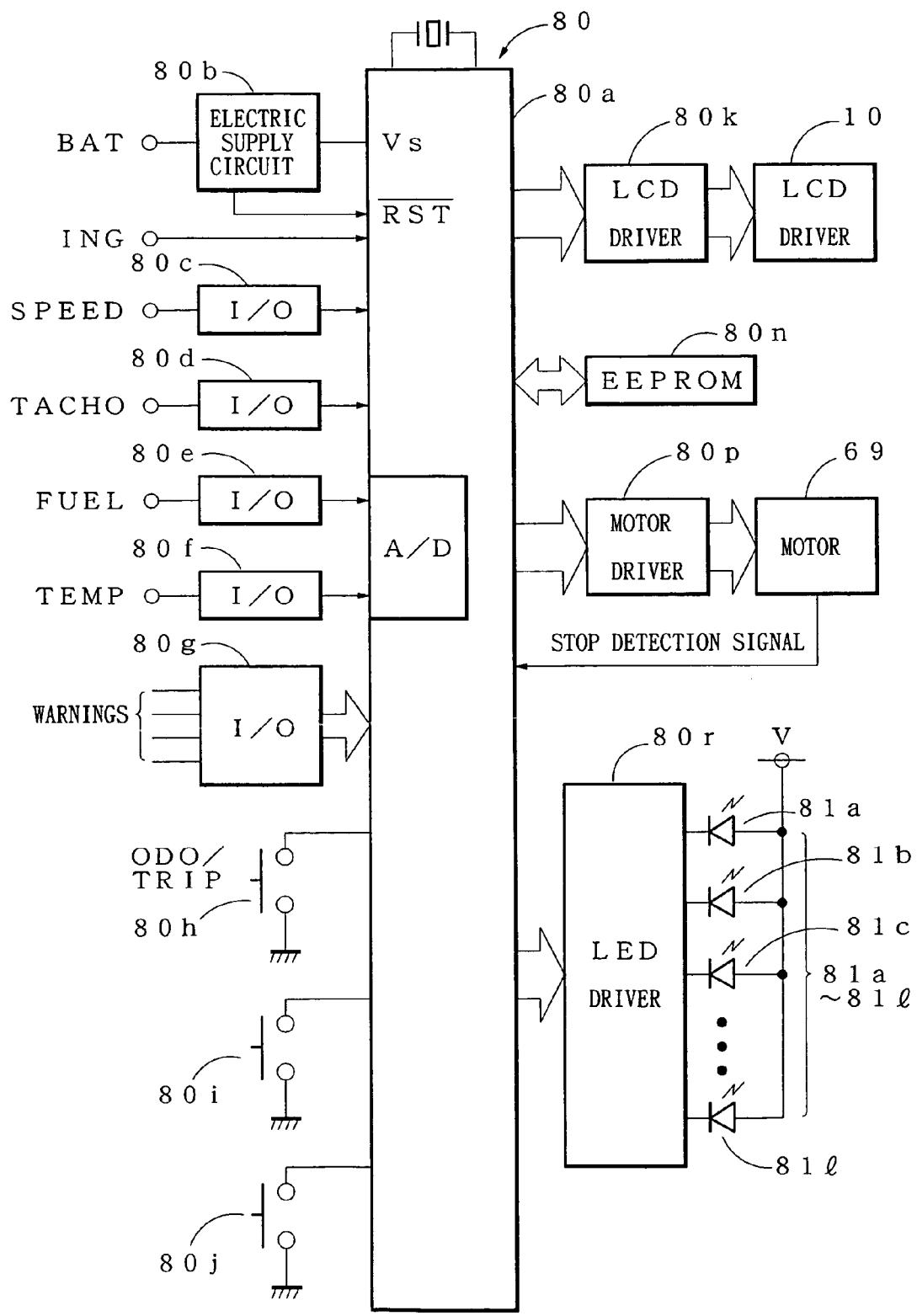
FIG. 8 is a block diagram showing an electric circuit of the display unit for the vehicle.

FIG. 8 shows a block diagram showing an essential part of a controller 80 mounted to a circuit board for controlling the graphic meter 50 of the display unit 1. The controller 80 includes a microcomputer (CPU) 80*a*, connected to a battery (not shown), to control a first and second controllers, an electric supply circuit 80*b* to supply an electric power to the CPU 80*a*, an input/output circuit (I/O) 80*c* to admit a signal of speed from a car speed sensor (not shown), an input/output circuit (I/O) 80*d* to admit a signal of tachometer from a rotation sensor (not shown), an input/output circuit 80*e* to admit a signal of fuel level from a fuel sensor (not shown), an input/output circuit 80*f* to admit a signal of coolant temperature from a thermometer (not shown), an input/output circuit 80*g* to admit signals from other sensors, a switch 80*h* of odometer/tripmeter, a shift specifier switch 80*i* for shifting the display partition 53, a display change specifier switch 80*j* to change the display design 56, an LCD driver 80*k* to drive a TFT type LCD display (graphic meter) 10 based on display signals of several informations output from the CPU 80*a* computing each detection signal, an EEPROM 80*n*, a motor driver 80*p* to drive the motor 69, and an LED driver 80*r* to drive the two colors LED of the plurality of the light emitting portions 81*a* to 81*l* installed in the annular display partition member 54.

Figure 9:
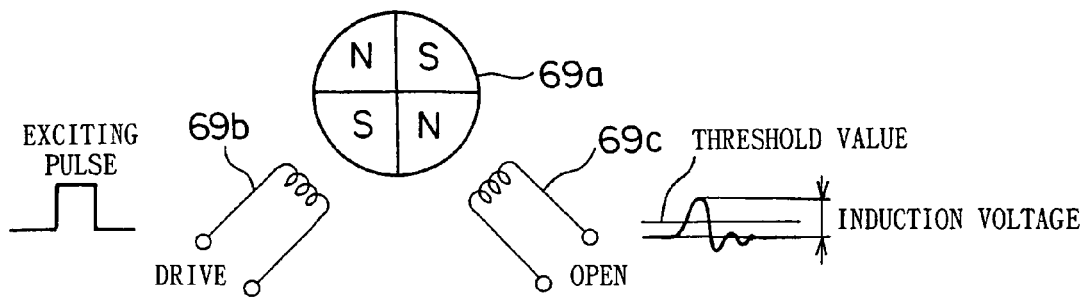
FIG. 9 is a schematic view illustrating a motor for the shifter.

The motor 69 is a step motor. As shown in FIG. 9, the step motor is step driven by applying a plurality of driving pulses having exciting steps in a exciting coil 69*b* to a rotor 69*a* magnetized alternatively N pole and S pole. The step motor has an induction voltage detection coil 69*c*. The detection coil 69*c* generates a induction voltage corresponding with the rotation of the rotor 69*a*. When the induction voltage is higher than a threshold value, it means a rotating state. When the voltage is lower than the threshold value, it means a stopping state. Accordingly, the induction voltage generated at the detection coil 69*c* is utilized for a stop detection signal of the motor 69 to be input to the CPU 80*a*.

The EEPROM 80*n* stores a number of the exciting steps to move the annular display partition member 54 from a starting position to a last stop position with the motor 69.

The CPU 80*a* controls a shift mode for moving the display partition member 54 and a rotation mode for rotating the display design 56.

Figure 10:
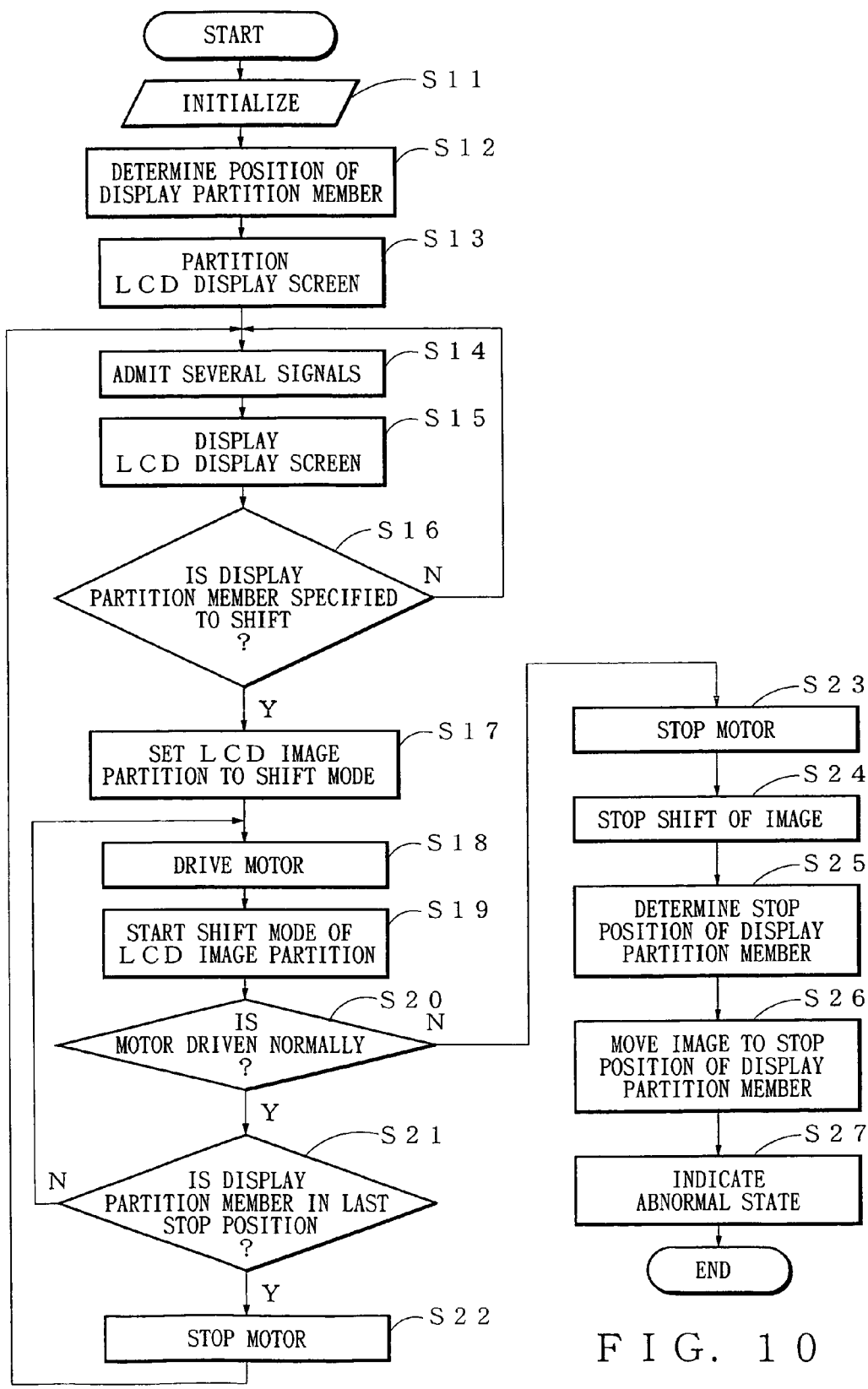
FIG. 10 is a flowchart showing a processing of a controller.

FIG. 10 is a flowchart showing a processing of the shift mode of the CPU 80*a* at the controller 80. When the display unit 1 is turned on, each portion of the controller 80 is initialized (step S11).

A position of the display partition member 54 is determined (step S12). The display screen of the LCD 51 is partitioned (step S13). The several detection signals are admitted (step S14). An initial screen is displayed on the graphic meter 50 (step S15) The initial screen is the screen as depicted in FIG. 1. Based on the detected signals from the several sensors, the display design 56 and the pointer 57 indicate the measured value according to the engine revolutions. The oil pressure meter 62, oil thermometer 63, fuel gauge 64, and coolant temperature gauge 65 indicate the corresponding states in bar displays.

The display design 56 and pointer 57 are surrounded by the annular display partition member 54 and magnified with the lens 55 so that the part of the display screen of the LCD 51 is magnified and appears higher than the other parts. The resulting display appears in three dimensional and provides a novel display.

Step S16 determines whether the display partition member 54 is assigned to move or not. The decision is made based on the shift specifier switch 80*i* (manual operation) as a prescribed shift signal or the detection of shift specifier signal (automatic operation) at an emergency display mode. The assignment of the emergency display mode is performed when a specifier signal of the emergency display mode, for example, abnormal temperature increase of the coolant, is input from the I/O circuit 80*g*.

When the signal from the operation (manual) of the shift specifier switch 80*i* or the detection (automatic) of the emergency display mode is not received (NO at step S16), step S16 returns to step S14. At step S14 and S15, the controller admits several detection signals and the display screen is initialized.

When step S16 is YES, the image partition of the LCD 51 is set to the shift mode stored in the EEPROM 80*n* (step S17). The CPU 80*a* sets the shift mode to a constant speed shift mode or acceleration shift mode adapted to the motor 69. In this embodiment, the shift mode is set to the acceleration mode.

In the acceleration shift mode, the image on the display screen can move together with the annular display partition member 54. In the constant speed shift mode, the movements of the image on the display screen and the partition member 54 do not coincide at the starting and stopping.

The motor 69 is driven at step S18 to move linearly the frame 68 with the shifter 67. The frame 68 is moved to the right in the direction of the long axis of the oval shaped display screen of the LCD 51. The annular display partition member 54 is moved together with the frame 68 from the center to the right.

Step S19 starts the image partition shift mode set at step S17. The display design 56 and pointer 57 move together with the display partition member 54 from the center to the right. The oil pressure meter 62, oil thermometer 63, fuel gauge 64, and the coolant temperature gauge 65 disappear prior to the movement of the display design 56 and pointer 57.

The display design 56 and pointer 57 move continuously with the visible speed and are always surrounded with the opening of the display partition member 54.

At step S20, the driving condition of the motor 69 is judged based on a position detection signal of the display partition member 54 and a stop detection signal from the motor 69. For example, when the motor 69 stops due to some malfunction of the shifter 67, the stop detection signal becomes lower than the threshold value so that the CPU 80a recognizes the motor 69 to have stopped. The CPU 80a counts the number of the exciting steps from start to interruption. Accordingly, when the number does not reach to the prescribed number, the CPU 80a recognizes the motor 69 being in the abnormal state.

Without the interruption, the CPU 80a recognizes the motor 69 being in the normal state.

When the motor 69 is driven in the normal state (YES at step S20), the movement of the display partition member 54 to the last stop position is judged at step S21. This judge is made based on the comparison between the count number of the exciting steps and the prescribed step number. When the number of the exciting steps reaches to the prescribed number, the display partition member 54 is judged to have reached to the last stop position. If the judgement at S21 is NO, the processing returns to step S18 and if the judgement is YES, the processing goes to step S22 and stops the motor 69 and returns to step S14. The display unit 1 appears of from FIG. 1 to FIG. 2.

At step S16, when the emergency display mode is assigned based on the emergency display mode specifier signal such as an abnormal temperature increase of the coolant, a bar display of the coolant temperature shows a different display manner, for example, blinking display or different color display to attract a driver's attention.

After the display partition member 54 stopping, when the shift specifier switch 80i is operated (YES at step S16) again, the display partition member 54 is returned to the prior position as shown in FIG. 1 with a reverse rotation of the motor 69 and a restoring display through steps S17 to S21.

If the motor 69 is not driven in the normal state (NO at step S20), the motor 69 is stopped (step S23). At step S24, the display design 56 and pointer 57 in the LCD 51 are stopped to move. At step S25, the stop position of the display partition member 54 is determined based on the number of the exciting steps.

At step S26, the display design 56 and pointer 57 are moved to the stop position of the display partition member 54. At step S27, the LCD 51 indicates that the motor 69 is abnormal state.

According to the above processings, even though the annular display partition member 54 is stopped due to the malfunction of the shifter 67, the images of the display design 56 and pointer 57 are displayed in the area surrounded by the annular display partition member 54.

The display unit for the vehicle of the present invention can provide an effective, novel and three-dimensional display with low cost. The shifter 67 is placed behind the facing board 52 and the LCD 51 to keep the appearance of the meter neat.

Figure 11:
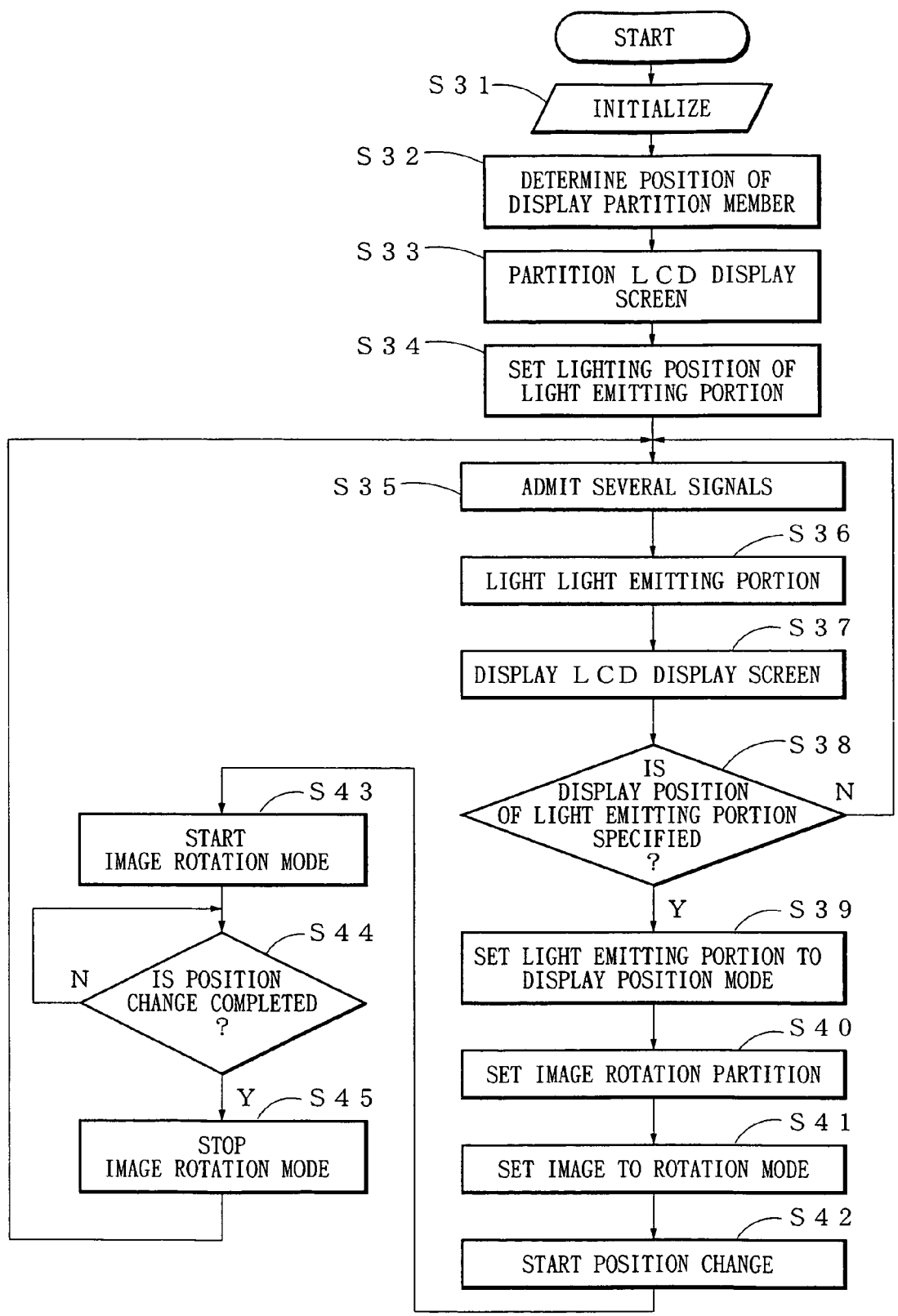
FIG. 11 is a flowchart showing a processing of a controller.
Figure 12:
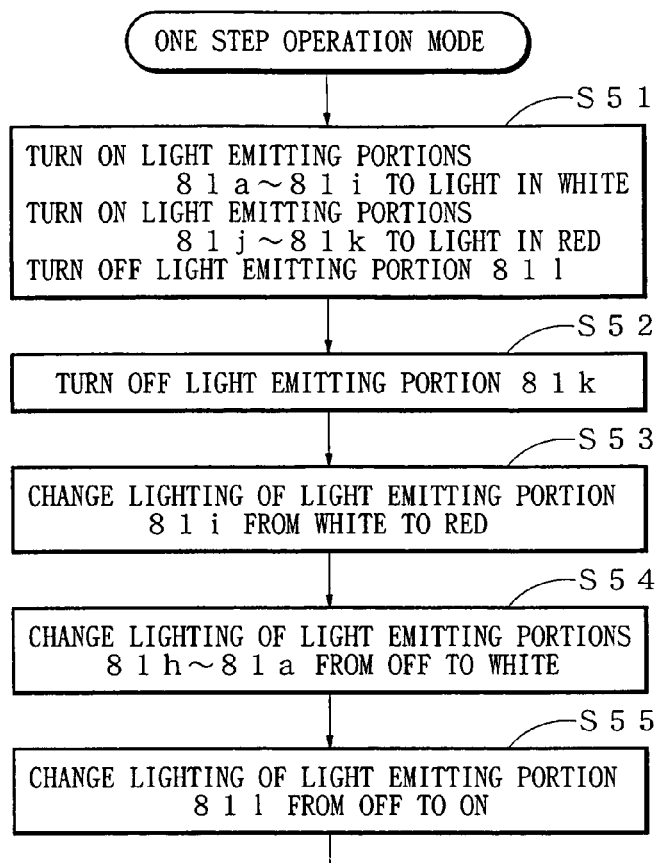
FIG. 12 is a flowchart showing a processing of a controller.
Figure 13:
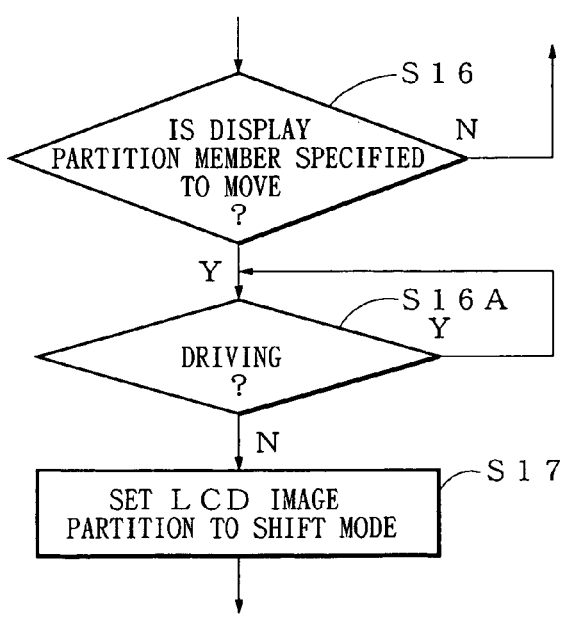
FIG. 13 is a part of the flowchart of the embodiment of the present invention.
Figure 15:
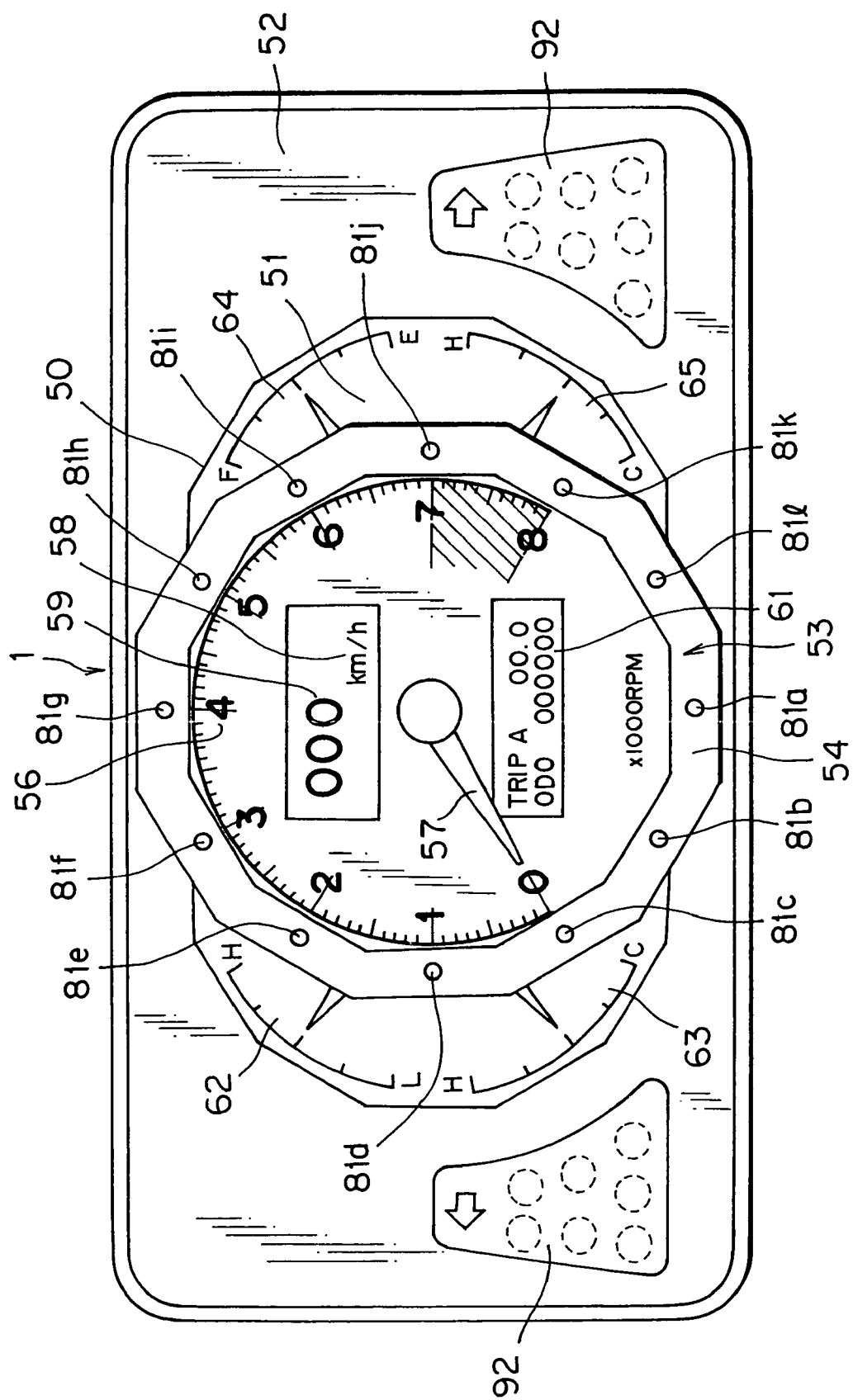
FIG. 15 is a front view showing a modification of the annular display partition member.
Figure 16A:
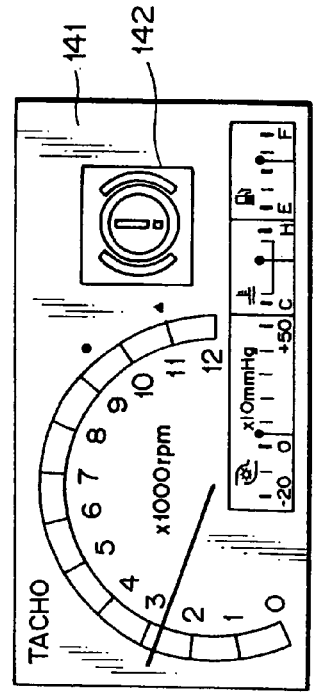
FIG. 16A is an overall view showing a conventional display unit for a vehicle.
Figure 17A:
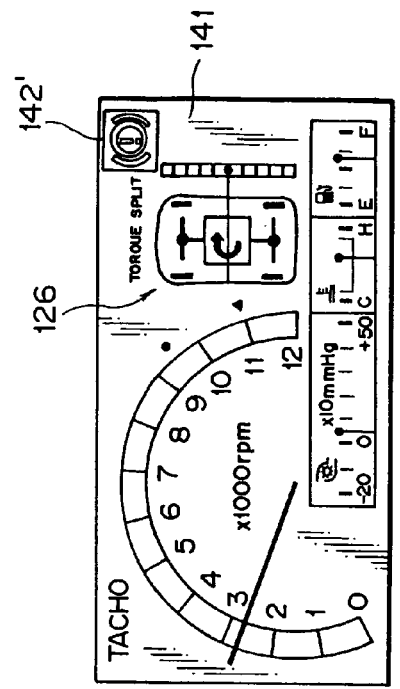
FIG. 17A is a display layout showing an other example of the display screen.
Figure 16B:
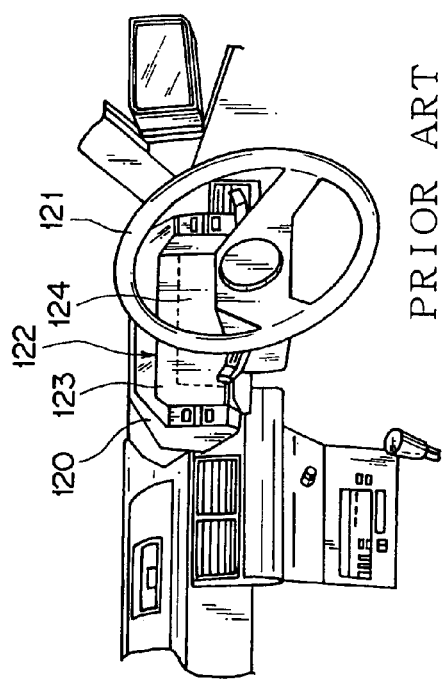
FIG. 16B is a display layout showing an example of the display screen of the conventional display unit.
Figure 17B:
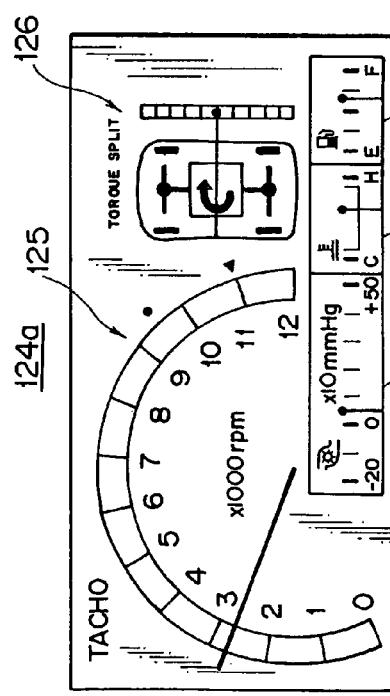
FIG. 17B is a display layout showing an other example of the display screen.
Figure 18:
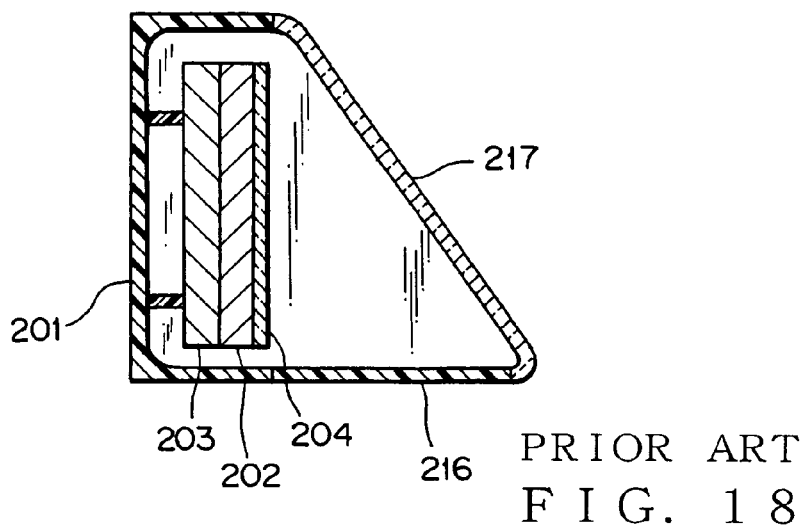
FIG. 18 is a vertical sectional view showing an other conventional display unit for a vehicle.
Figure 19A:
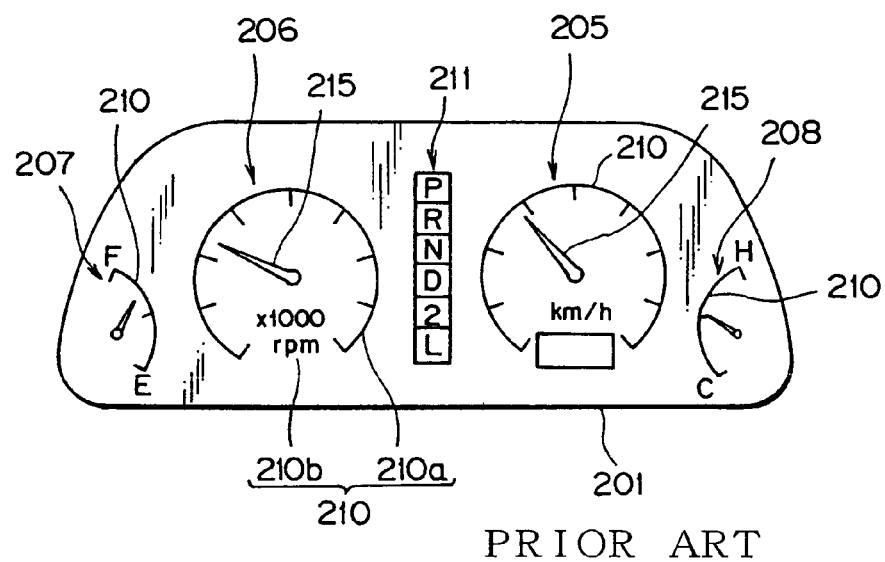
FIG. 19A is a front view showing analog displays of FIG. 18.
Figure 19B:
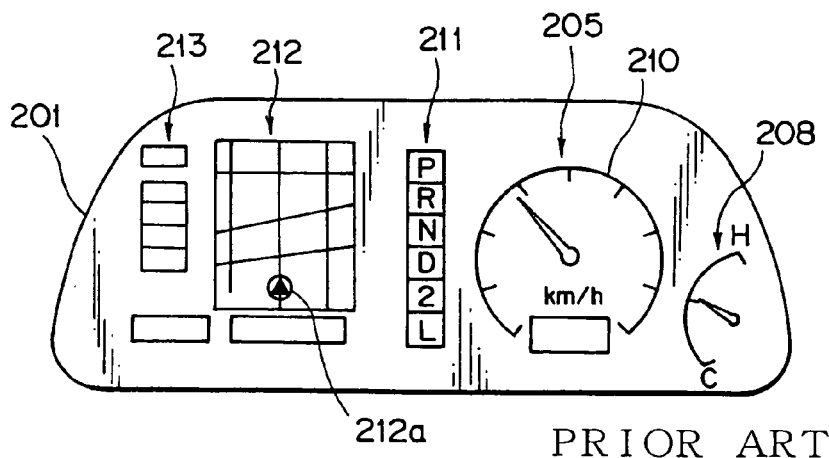
FIG. 19B is a front view showing the analog display and an information of car navigation of FIG. 18.

FIGS. 11 and 12 illustrate a flowchart of the rotation mode at the CPU 80a. In FIG. 11, when the display unit 1 is turned on, the controller 80 is initialized (step S31).

At step S32, the position of the display partition member is determined. At step S33, the display screen of the LCD 51 is partitioned. At step S34, the lighting position of the light emitting portions 81a to 81l is set up. At step S35, the controller 80 admits several detection signals.

At step S36, the light emitting portions 81a to 81l are driven according to the setting at step S34. The two colors LED of the light emitting portions 81c to 81i light in white, the light emitting portions 81j, 81k light in red, and the two colors LED of the light emitting portions 81a, 81b, 81l do not light.

At step S37, an initial display screen is displayed on the full graphic meter 50 based on the setting at step S33. The initial screen shows the display design 56 and pointer 57 for the engine revolution number, oil pressure meter 62, oil thermometer 63, fuel gauge 64, and coolant temperature gauge 65 which indicate the value measured by each sensor in the bar displays.

The initial display screen shows the image of FIG. 1 on the screen through steps S36 and S37.

At step S38, the change of the display position of the light emitting portions 81a to 81l is judged. The judgement is made based on the operation (manual operation) of the display change specifier switch 80j or a predetermined display change specifier signal requested from the CPU 80a (automatic operation).

If step S38 is NO, the processing returns to step S35. In this case, the processing flows through steps S35 to S37.

If the operation of the display change specifier switch 80j or the internal request for the display change by the CPU 80a is given, the display of the light emitting portions 81a to 81l are set to the display position mode stored in the EEPROM 80n (step S39).

The display position mode has a one step operation mode shown in FIG. 12. At step S36 in the flowchart of FIG. 11, the light emitting portions 81c to 81i light in white, the light emitting portions 81j, 81k light in red, and the light emitting portions 81a, 81b, 81l do not light (step S51). At step S52, the light emitting portion 81k is turned off. At step S53, the light emitting portion 81i turns from white to red. At step S54, the light emitting portion 81h lights in white right after turning off and the light emitting portions of 81g, 81f, 81e, 81d, 81c light in white right after turning off in order. At step S55, the light emitting portion 81l turns off and turns on.

The one step operation mode provides a step-by-step lighting of the light emitting portions in a counterclockwise direction. The one step operation mode drives the red light to move from 81j to 81i, 81h, 81g or from 81k to 81j, 81i, 81h in order. The one step operation mode gives the apparent rotation of the annular display partition member 54, though in rest, in the counterclockwise.

At step S40, an area of an image rotation is set up at the same time of the display position change of the light emitting portions 81a to 81l. At step S41, the display design 56 is set up to the image rotation mode stored in the EEPROM 80n. The image rotation mode is set to either a synchronized image rotation mode synchronized with the speed of the display position change of the light emitting portions 81a to 81l or a time-delayed image rotation mode having a time delay with respect to the speed. The present embodiment is set to the synchronized image rotation mode.

At step S42, the display position of the light emitting portions 81a to 81l changes according to the one step operation mode of step S39. Each of the light emitting portions is turned on step-by-step in order in the counterclockwise direction as described above.

At step S41, the image rotation mode starts. The number scales of 0 to 8 in the display design 56 rotates in the counterclockwise direction synchronized with the display change of the light emitting portions 81a to 81l at the one step mode.

At step S44, the completion of the display position change of the light emitting portions 81a to 81l is judged. The judgement is based on the prescribed number of steps, for example, 3 steps, for the light emitting portions 81a to 81l to rotate.

When the display position change is completed (YES at step S44), the light emitting portions 81a to 81l become a state of FIG. 3. At step S45, after the completion of the display position change, the image rotation mode stops. The image of the display design 56 is rotated with a prescribed angle, for example, 90 degrees in the counterclockwise direction.

The resulting display screen of the LCD 51 becomes the display screen of FIG. 3.

After step S45, the processing returns to step S35 and repeats steps S39 to S45 when received the order of the display position change of the light emitting portions at step S38 and the LCD display screen returns to the screen of FIG. 1.

The rotation mode changes the lighting mode of the light emitting portions 81a to 81l (switching between white and red) and turns on and off them. Accordingly, the annular display partition member 54 apparently rotates and the display unit 1 provides the three dimensional and attractive appearance.

The rotation mode is capable of locating the red zone of the tachometer at an upper portion of the meter so as to see easily. Then, when a driver is driving a motor vehicle in a circuit, it is easy to decide the timing of a change of a shift lever. In the rotation mode, when the driver accelerates the vehicle with a gear change, it is not necessary to watch the speed of the digital display of the speed meter 59. On the contrary, the driver watches only the tachometer and shifts the gears to accelerate the vehicle when the pointer of the tachometer enters into the red zone between the number scale 7 and 8.

The rotation mode operating at the circuit drive may be called as a circuit mode. In the circuit mode, the shift mode is operated after the rotation mode so that a circuit road map or air pressures of tires necessary for driving can be displayed on the left side screen of the LCD 51.

The embodiments of the present invention are explained in the specification and drawings but not limited to them. The modifications and alternatives thereof are possible.

As another embodiment, the position of the annular display partition member 54 and the display design 56 and the pointer 57 are set to be held during driving. This can be done by inserting step S16A, which judges the driving of the vehicle, between steps S16 and S17 in the flowchart of FIG. 10 and the next step S17 is only allowed when the vehicle is stopped. The judgement at step S16A is made based on the speed detection signal (SPEED) from the speed sensor.

Figure 14A:
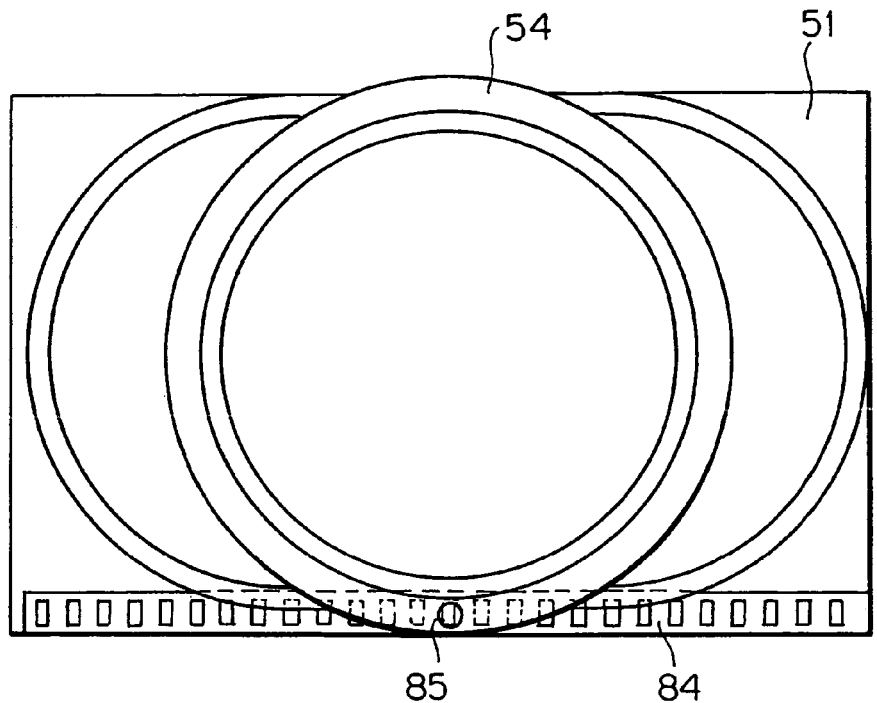
FIG. 14A is an illustration showing another embodiment of a position detection method.
Figure 14B:
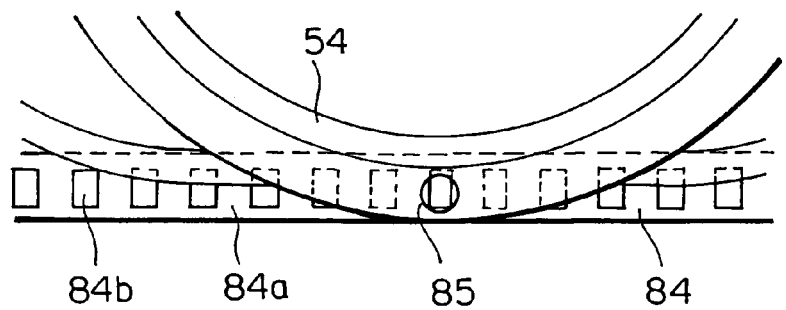
FIG. 14B is a partially expanded view of FIG. 14A.

In this embodiment, the detection of the last stop position is determined from the number of the exciting steps and the prescribed number. There are other detection methods. As shown in FIG. 14, a dark portion 84a and light portions 84b are disposed at a lower portion of the display screen of the LCD 52 covered with the facing board 52. The light portions 84b are squared shape and aligned in the dark portion 84b to provide a prescribed position as a position detection marker. A photo sensor 85 disposed behind the annular display partition member 54 detects the light portions 84b to detect the last stop position.

In the above embodiment, the tachometer of the display design 56 and the pointer 57 is displayed in analog and the speed meter is displayed in digital. In place of that, the speed meter may be displayed in analog and the tachometer in digital.

The digital or analog display can be changed by a operation switch. The display can show possible combinations of the above analog and digital displays at the initial position and the stop position of the display partition 53.

Preferably, the motor 69 is fixed to the frame 68 and the rack 70e is fixed to the base plate 83.

Preferably, a screw drive method is adopted for the transmission device 70 instead of the gear belt method.

Preferably, the movement of the annular display partition member 54 is ensured by a effective sound such as "gee" from start to stop by disposing a moving sound generator with the control of the CPU 80a.

After the annular display partition member 54 is moved, the display area left shows the several bar displays 66 as shown in FIG. 2. In place of that, preferably, a navigation or a back guiding monitor is displayed.

Preferably, another sub-display LCD can be disposed in front of the LCD 51 and surround the opening of the annular display partition member 54 to be moved by the shifter 67.

Preferably, the LCD can be replaced by an organic EL or plasma display.

Preferably, a specifier signal of the emergency display mode is input from I/O circuit 80g based on a detection of an abnormal low pressure of tires instead of the coolant temperature. In this case, the area of the bar displays 66 shows the whole vehicle and the tires among which the tire of abnormal low pressure is displayed with a different display mode to attract the driver's attention. Specifier signals of other emergency display modes are adapted to a half-shut door or a detached seat belt.

Preferably, in place of the rotation mode (circuit mode), an engine speed having a best mileage can be displayed in the place to see easily the zone similarly to the rotation mode in FIG. 3 and to shift the gear when the pointer enters into the mileage zone.

Preferably, all the light emitting portions 81a to 81l can blink on and off during the shift mode in order to show the shift of the annular display partition member 54 effectively and to give the apparent rotation thereof.

Preferably, the light emitting portions 81a to 81l can be other light emitting elements such as lamp or LCD.

Preferably, the annular display partition member 54 is not limited to the circular shape but polygonal shape or a circular shape having a straight portion in part.

What is claimed is:

1. A display unit for a vehicle comprising:

a display screen having display areas displaying a plurality of information about conditions of the vehicle;

a display partition member disposed directly in front of the display areas and having an opening, said display partition member being moveable linearly relative to the display areas of the display screen; and a first controller for controlling images on the display screen and controlling movement of the display partition member during operation of the vehicle;

wherein said first controller controls the display screen to display an image of a display design of a dial on a first display area surrounded by the opening of the display partition member and controls the display partition member to move it linearly relative to the display areas of the display screen; and a shifter for shifting the display partition member;

wherein said shifter supports the display partition member in front of the display screen and includes a frame extending to a rearward of the display screen, a motor fixed on the rear side of the display screen, and a transmission device for moving the frame with a driving power of the motor.

2. The display unit as claimed in claim 1, further comprising a plurality of light emitting portions disposed on the display partition member with a prescribed separation and a second controller for controlling the display screen to control at least one of the plurality of the light emitting portions to light in a different type of lighting other than others, wherein said second controller controls the display screen to control the different type of lighting to move from the at least one light emitting portion to the others successively in order to change the display based on the prescribed display change specifier signal.

3. The display unit as claimed in claim 1, wherein the first controller controls the display screen to move the image of the display design synchronously with a movement of the display partition member.

4. The display unit as claimed in claim 1, further comprising a magnifier lens for magnifying the image of the display design, said lens being attached to the display partition member.

5. The display unit as claimed in any one of claims 1, 3, or 4, further comprising a moving sound generator for generating an effective sound for indicating the movement of the display partition member.

6. The display unit as claimed in claim 1, wherein said first controller controls the display screen to rotate the image of the display design based on a prescribed display change specifier signal.

* * * * *